(12) United States Patent
Hoeflin et al.

(10) Patent No.: US 8,015,276 B2
(45) Date of Patent: Sep. 6, 2011

(54) METHOD TO IDENTIFY PERFORMANCE AND CAPACITY BOTTLENECKS OF COMPLEX SYSTEMS

(75) Inventors: David A. Hoeflin, Middletown, NJ (US); Harold Orr McCaskey, III, Alpharetta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 249 days.

(21) Appl. No.: 12/313,236

(22) Filed: Nov. 18, 2008

(65) Prior Publication Data

US 2010/0125755 A1   May 20, 2010

(51) Int. Cl.
  *G06F 15/173*   (2006.01)
(52) U.S. Cl. ........... 709/223; 709/224; 709/226; 703/22
(58) Field of Classification Search .......... 709/223–224, 709/226; 703/22
  See application file for complete search history.

(56) References Cited

U.S. PATENT DOCUMENTS

| | | | |
|---|---|---|---|
| 5,764,912 A * | 6/1998 | Rosborough | 709/224 |
| 5,838,920 A * | 11/1998 | Rosborough | 709/224 |
| 7,197,559 B2 * | 3/2007 | Goldstein et al. | 709/224 |
| 7,349,340 B2 * | 3/2008 | Sahai et al. | 370/235 |
| 7,426,738 B2 * | 9/2008 | Deverill et al. | 719/328 |
| 7,552,208 B2 * | 6/2009 | Lubrecht et al. | 709/223 |
| 7,568,019 B1 * | 7/2009 | Bhargava et al. | 709/223 |
| 7,590,508 B1 * | 9/2009 | Saghier et al. | 702/182 |
| 7,680,916 B2 * | 3/2010 | Barnett et al. | 709/223 |
| 7,689,688 B2 * | 3/2010 | Iwamoto | 709/224 |
| 2002/0062237 A1 * | 5/2002 | Matsumoto et al. | 705/7 |
| 2002/0198985 A1 * | 12/2002 | Fraenkel et al. | 709/224 |
| 2003/0202638 A1 * | 10/2003 | Eringis et al. | 379/15.01 |
| 2004/0257985 A1 * | 12/2004 | Sahai et al. | 370/229 |
| 2005/0044197 A1 * | 2/2005 | Lai | 709/223 |
| 2005/0165925 A1 * | 7/2005 | Dan et al. | 709/224 |
| 2005/0188221 A1 * | 8/2005 | Motsinger et al. | 713/201 |
| 2006/0161884 A1 * | 7/2006 | Lubrecht et al. | 717/104 |
| 2006/0248529 A1 * | 11/2006 | Loboz et al. | 718/100 |
| 2007/0271219 A1 * | 11/2007 | Agarwal et al. | 707/2 |
| 2007/0299968 A1 * | 12/2007 | Loboz et al. | 709/224 |
| 2008/0270526 A1 * | 10/2008 | Barnett et al. | 709/203 |
| 2009/0031066 A1 * | 1/2009 | Bansal et al. | 710/113 |
| 2009/0119301 A1 * | 5/2009 | Cherkasova et al. | 707/10 |
| 2009/0307347 A1 * | 12/2009 | Cherkasova et al. | 709/224 |
| 2010/0094992 A1 * | 4/2010 | Cherkasova et al. | 709/224 |

* cited by examiner

*Primary Examiner* — Asad M Nawaz
*Assistant Examiner* — Waseem Ashraf (57) ABSTRACT

Systems and methods are described that analyze complex systems and identify potential performance bottlenecks that may affect capacity and response time. The bottlenecks are identified to resolve problems originating at a specific subsystem(s).

18 Claims, 9 Drawing Sheets

METHOD TO IDENTIFY PERFORMANCE AND CAPACITY BOTTLENECKS OF COMPLEX SYSTEMS

BACKGROUND OF THE INVENTION

The invention relates generally to monitoring complex systems in which some subsystem performances are either hidden from external monitoring or the transaction flows across these subsystems are unknown. More specifically, the invention relates to systems and methods that monitor and estimate complex system load and determine transaction capacities.

A complex system is defined as a large number of integrated subsystems or applications that are coupled together and are used to solve complex business problems such as provisioning of services. One system architecture approach taken to investigate the flow of the functions performed by a complex system is to use performance data of the functions collected by a Workflow Manager (WFM), develop a response time bottleneck model, and apply the data to estimate the model parameters to make predictions about current and future capacity and response times for the functions. Once the problem functions have been identified, a root cause analysis may be performed on the underlying subsystems.

For complex systems having many supporting subsystems and applications, it is common to monitor hardware health such as CPU consumption, memory usage, and other parameters, of all the supporting subsystems. However, the WFM response times and subsystem software bottlenecks are not typically monitored.

Identifying poor subsystem performance using response times may be complicated by focusing on running the complex system efficiently. While running hardware components such as CPUs at high utilization may reduce the number of hardware components required, to end users, running efficiently is not the same as running acceptably. The response times' performances may be greater than stated targets. It is possible to have high efficiency but low acceptability. Aside from end users bearing the indirect costs of poor performance, the direct costs are increased staff.

There is a need to balance the tradeoff between additional systems costs and staffing costs, and the necessity to monitor response times for acceptability with respect to load. Both experience and analysis indicate that for complex functions traversing many subsystems, an average response time curve may be thought of as being flat or constant until reaching a specific load at which point the response times sharply increase. For these types of cases, there may not be an early warning such as a slow degradation in the response times to indicate a need to monitor and model response times.

What is desired are systems and methods that analyze complex systems and identify potential problems before they manifest into actual problems.

SUMMARY OF THE INVENTION

The inventors have discovered that it would be desirable to have systems and methods that analyze complex systems and identify potential performance bottlenecks. Embodiments identify functions having bottlenecks that may affect their capacities and response times. The bottlenecks are identified to resolve problems originating at a specific subsystem(s).

Embodiments use a data centric approach rather than a system architecture approach and know little about how the underlying subsystems work together to service the complex system and treat the complex system like a black box. Methods obviate examining all of the component subsystems for potential problems by identifying one or more subsystem(s) to be investigated and repaired.

One aspect of the invention provides a method for determining capacity in complex systems by setting capacity limits for transactions that assist in identifying performance bottlenecks. Methods according to this aspect of the invention include listing the service transaction types, identifying Workflow Manager (WFM) data where invocation data records for each service transaction type are located, retrieving the WFM data, parsing the WFM data to acquire the invocation data records for each service transaction type, for a given transaction type, determining average response time $RT_h$ aggregation levels and volume counts $count_h$, wherein the volume counts $count_h$ is the traffic load and is a count of successful transactions within a predetermined measurement interval, performing a linear regression of data pairs ($count_h$, $RT_h$), determining an average Response Time Model RTM (x), estimating response time model $z_0$, $z_1$ and $z_2$ parameters from the average response time $RT_h$ and volume counts $count_h$ data, calculating a maximum throughput $$\frac{1}{z_2}$$

that the complex system can handle, calculating a capacity warning value $L_1$, calculating a capacity limit value $L_2$ and analyzing a time trend of volume counts $count_h$ to determine when the capacity warning value $L_1$ and capacity limit value $L_2$ will be reached if current volume counts $count_h$ trends continue.

The details of one or more embodiments of the invention are set forth in the accompanying drawings and the description below. Other features, objects, and advantages of the invention will be apparent from the description and drawings, and from the claims.

DETAILED DESCRIPTION

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having," and variations thereof herein is meant to encompass the items listed thereafter and equivalents thereof as well as additional items.

The terms "connected" and "coupled" are used broadly and encompass both direct and indirect connecting, and coupling. Further, "connected" and "coupled" are not restricted to physical or mechanical connections or couplings.

It should be noted that the invention is not limited to any particular software language described or that is implied in the figures. One of ordinary skill in the art will understand that a variety of alternative software languages may be used for implementation of the invention. It should also be understood that some of the components and items are illustrated and described as if they were hardware elements, as is common practice within the art. However, one of ordinary skill in the art, and based on a reading of this detailed description, would understand that, in at least one embodiment, components in the method and system may be implemented in software or hardware.

Embodiments of the invention provide methods, systems, and a computer-usable medium storing computer-readable instructions. Components of the invention may be enabled as a modular framework and/or deployed as software as an application program tangibly embodied on a program storage device. The application code for execution can reside on a plurality of different types of computer readable media known to those skilled in the art.

By way of background, a complex system is a large number of subsystems and component applications integrated into a platform to solve a defined business problem. There may be tens to hundreds of subsystems that make up a complex system. Subsystems are for the most part developed independently of other subsystems and component applications and may service multiple business functions. One example of a business problem is the AT&T U-verse provisioning process. The AT&T U-verse is a group of services provided over Internet Protocol (IP) that includes television service, Internet access, and voice telephone service. To obtain AT&T U-verse service, a customer would contact an AT&T Customer Service Representative (CSR) who would provision the service for the customer. To do the provisioning requires several steps with each step performing a specific function or a specific set of functions that interact with multiple "backend" systems to complete the business transaction of provisioning. Example transactions include validating a customer's address, checking Digital Subscriber Lines (DSLs), selecting a tier of service, checking billing, and others. The CSR will often interface with a WFM.

At a high level, the WFM is the front end a system user or CSR would interact with to use the complex system. It provides transactions that a user can choose or it may be a simple interface to various backend systems. Once the user chooses a transaction, the WFM will handle any mundane interactions with the backend systems to complete the selected transaction and present the results to the user. In many cases, the WFM collects statistics on transactions such as transaction start and finish times, whether the transaction was a success or failure, and others. Other business functions interacting with various backend subsystems may or may not be known to the CSR or WFM.

Figure 1:
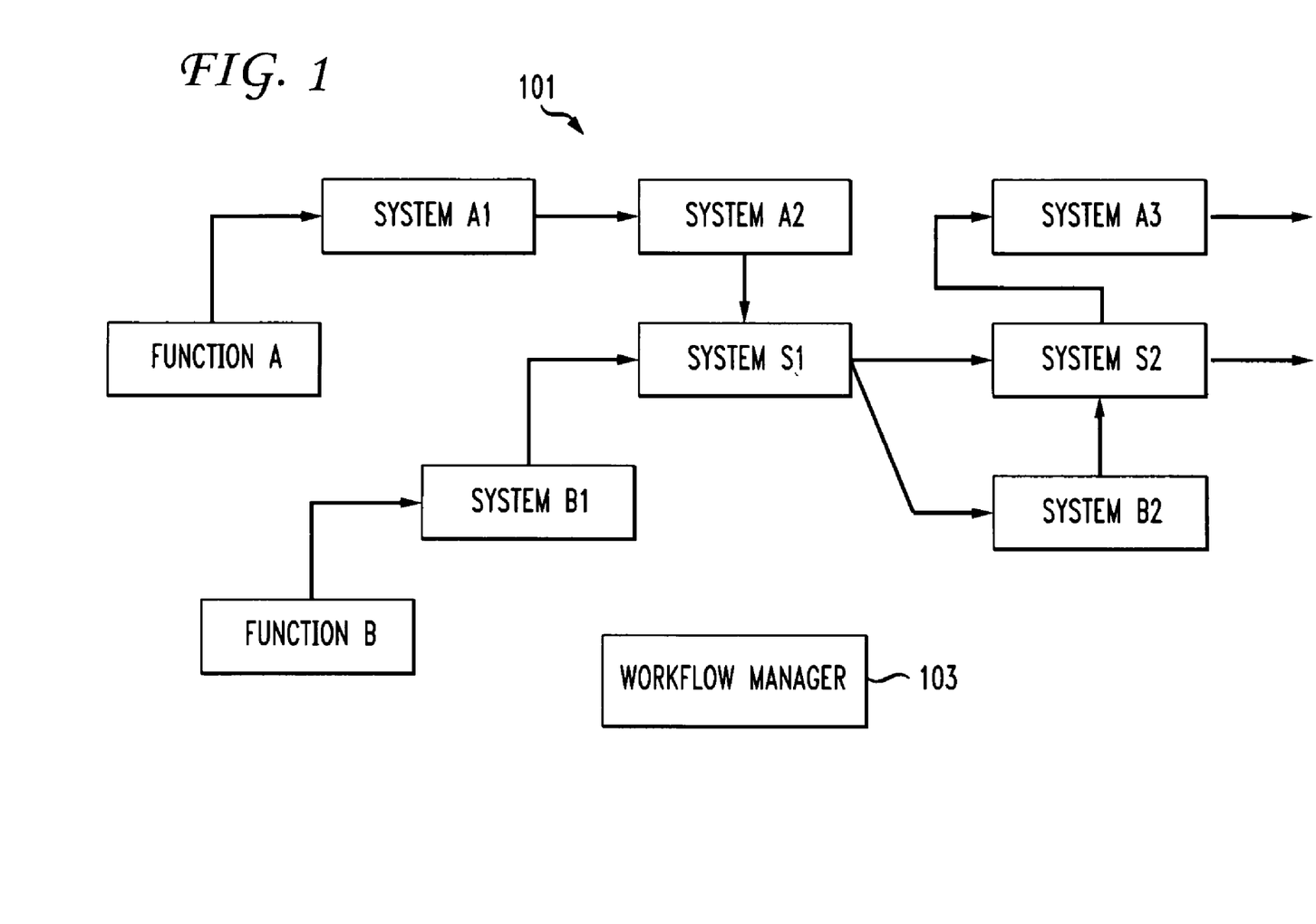
FIG. 1 is an exemplary complex system high level flow through many interrelated subsystems.

FIG. 1 shows a high level flow of a complex system 101 through many interrelated subsystems (service nodes) $A_1$, $A_2$, $A_3$, $B_1$, $B_2$, $S_1$, $S_2$ and component applications function A, function B used to service various end user functions, and a WFM 103. A function may span multiple subsystems with subsystems supporting multiple functions. All of the functions do not have to use all of the subsystems and all subsystems do not have to support all functions. The timing of various function invocations is critical to the individual subsystems.

None of the complex system's architecture, subcomponents' hardware and software properties, work flows of the various transactions across the system components or other work being performed by the backend subsystems need be known in order for embodiments to determine the overall system's capacity for the various transactions. Embodiments are applicable even as the underlying architecture and components change over time and as new data becomes available. By definition, the complex system capacity for a given transaction is the number of functions per unit time that can be processed while still meeting the required response time of an end user for this function, if known, or below the limit at which small changes in load would cause disproportionate changes in response time. Embodiments employ a capacity warning value $L_1$ and a capacity limit value $L_2$.

Figure 2:
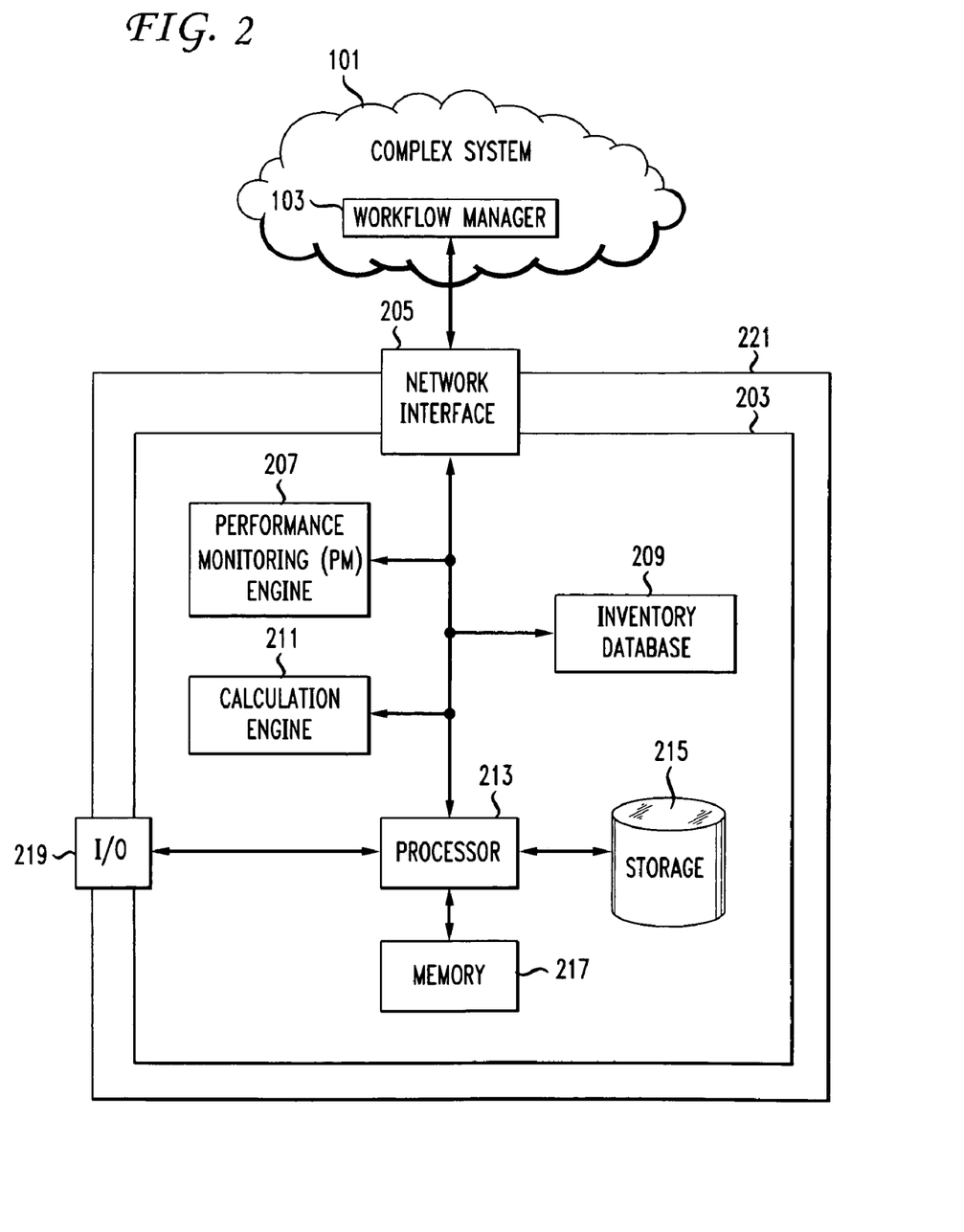
FIG. 2 is an exemplary system framework.
Figure 3:
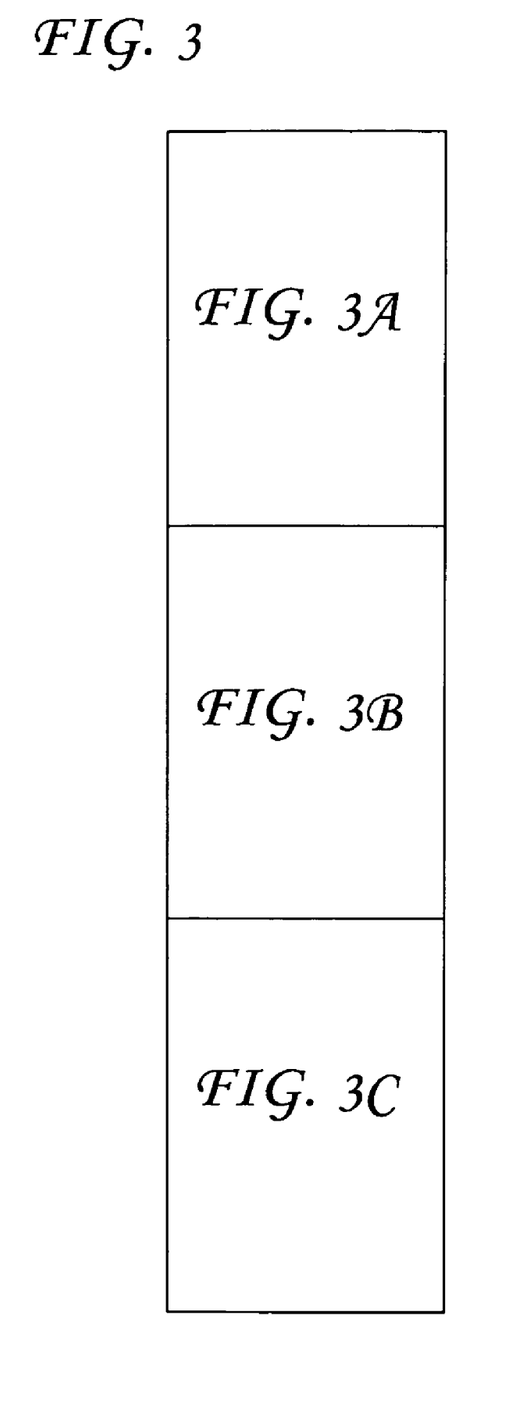
FIG. 3 is an exemplary method.
Figure 3A:
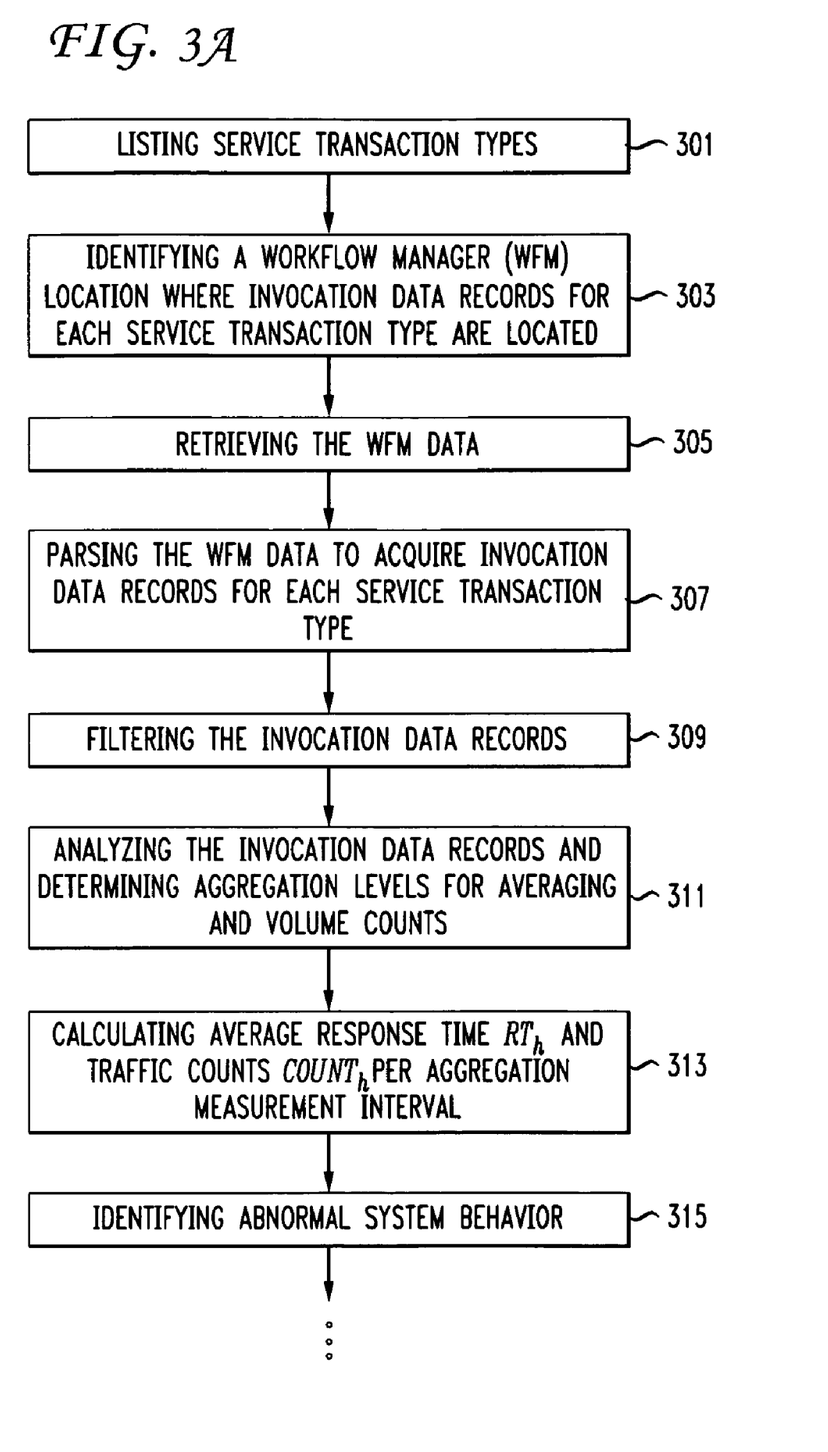
Figure 3B:
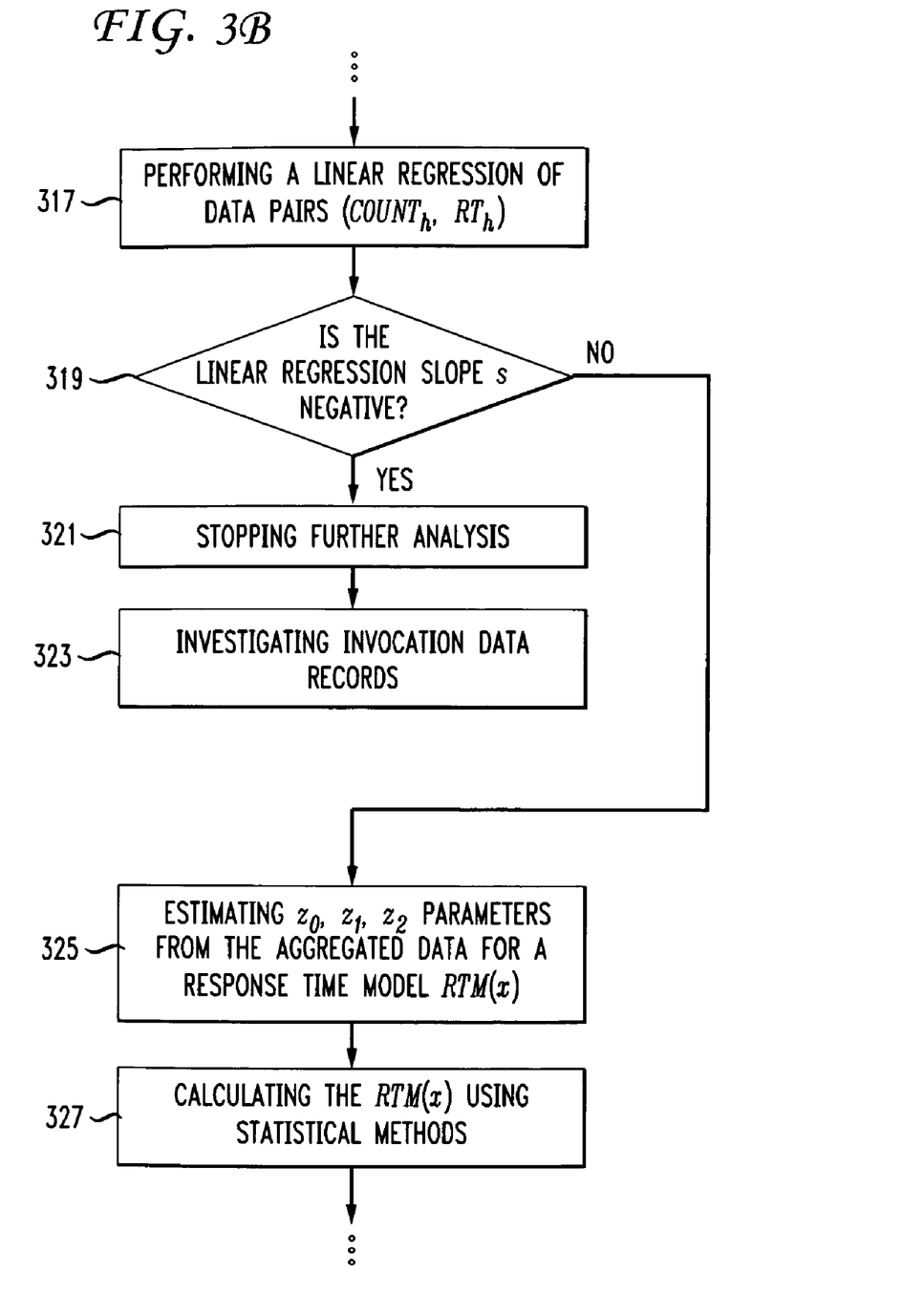
Figure 3C:
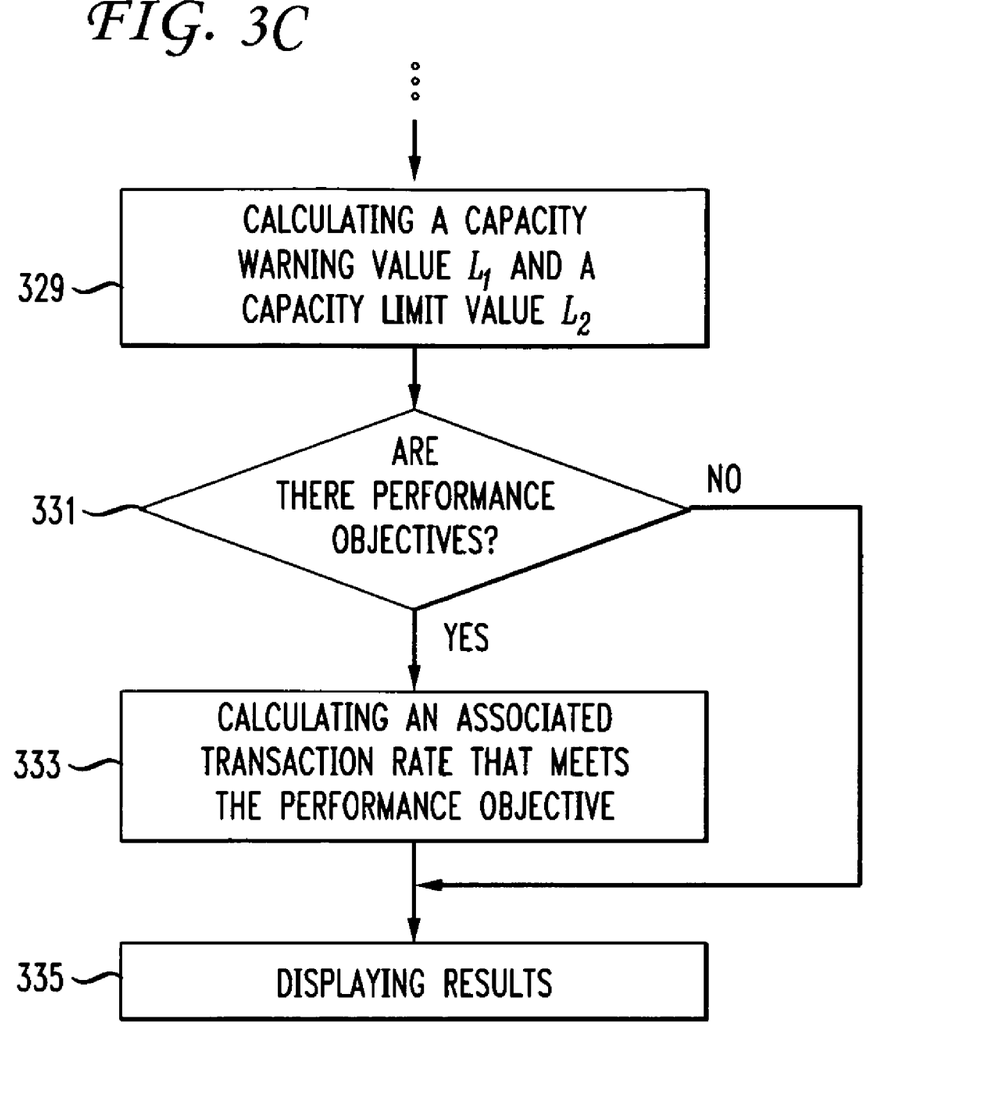

FIG. 2 shows an embodiment of a system framework 203 and FIG. 3 shows a method. The framework 203 which may be part of a network management server 221 includes a network interface 205 coupled to a network and configured to acquire data from a WFM 103, network reachability information, as well as network status information to perform performance and capacity modeling. The network interface 205 is coupled to a performance monitoring engine 207, an inventory database 209, a calculation engine 211 and a processor 213. The processor 213 is coupled to storage 215, memory 217 and I/O 219.

The framework 203 stores acquired WFM 103 data in the database 209. The framework 203 may be implemented as a computer including a processor 213, memory 217, storage devices 215, software and other components. The processor 213 is coupled to the network interface 205, I/O 219, storage 215 and memory 217 and controls the overall operation of the computer by executing instructions defining the configuration. The instructions may be stored in the storage device 215, for example, a magnetic disk, and loaded into the memory 217 when executing the configuration. The invention may be implemented as an application defined by the computer program instructions stored in the memory 217 and/or storage 215 and controlled by the processor 213 executing the computer program instructions. The computer also includes at least one network interface 205 coupled to and communicating with a network WFM 103 to interrogate and receive WFM 103 data. The I/O 219 allows for user interaction with the computer via peripheral devices such as a display, a keyboard, a pointing device, and others.

In order to find the performance and capacity bottlenecks for a set of transactions supporting a business service using a given complex system, a list of service transaction types or functions is compiled (step 301). For example, each business service is made up of a set of transaction types such as "get home address", "get billing address", "get billing information" and others.

Given a set of transaction types, embodiments identify where a transaction log for the transaction type data is kept and retrieve the data using agents, bots, spiders, or other network mechanisms (steps 303, 305). Typically, a WFM 103 has a transaction log. Analyzing the log data for a particular transaction type obtains records for each invocation of that transaction type such as "start time", "end time", "success", "fail", "duration" and others. Typically, the invocation data record time stamps are in the format of date:hour:min:sec, "success" is 1 (yes) or 0 (no) and "duration" (response time) may be in seconds or other time units. The formatting depends on the systems involved. Parsing the WFM data yields sets of invocation data records for each transaction type, such as for "get home address". If the parsed WFM data does not include an invocation record for "duration", the difference between "start time" and "end time" is calculated. "Duration" is a service transaction type invocation response time. Each transaction service type invocation made by either a customer or a CSR creates an invocation data record (step 307).

The data from complex systems that is readily available is the average Response Time (RT) which is the average of the response time for transactions completing within a time period and can be calculated per time interval. The count of transactions completing within the per unit time interval (carried load) is close to the count of transactions initiated within the time interval (offered load). By analyzing an RT vs. load curve, a determination of which functions are showing significant sensitivity to load may be made and subsystems that may be approaching capacity exhaustion may be identified.

Filtering incorrect data is performed on acquired invocation data records to arrive at an accurate average estimate (step 309). Filtering rules for each service transaction type may be developed and employed. In some cases it is clear that some data is in error, for example, an "end time" before a "start time" which is filtered out.

The specific statistical nature of the transaction traffic determines the length of the time interval over which the average is calculated and the carried load is counted. Generally, the measurement interval should be long enough that it has at least 30 or more completed transactions. Once the time interval has been set, for example, one hour, the invocation data records for a service transaction type are aggregated over the measurement intervals and those intervals which have too few transactions are excluded from further analysis. It is possible that as load increases in the future, the choice of the time interval, e.g., one hour, may be shortened to a quarter of an hour (step 311).

For a measurement interval h, average response time and carried load is calculated (step 313). Given the measurement interval h, a $count_h$ is calculated of successful transaction type invocations and their associated average response $time_h$ or $RT_h$ over the measurement intervals having sufficient counts of transactions by transaction type.

Over time, it is possible that some of the "hidden" subsystems had a known abnormal behavior over the measurement interval, e.g., periodic backup or software upgrades or a subsystem failure causing an outage that stops servicing of transaction requests. The abnormal behavior may be detected by summing all "success" and "failed" invocation data records within the measurement interval and summing all "failed" invocation data records within the measurement interval. If the "failed" sum is greater than a predefined percentage of the "success" and "failed" sum, this behavior is not representative of normal system behavior and may be considered abnormal. The measurement intervals affected are discarded from the analysis unless upon inspection or via a Rules Based Expert System (RBES) it is determined that the transaction type was unaffected by the event in which case the measurement intervals need not be discarded (step 315).

Not all functions may show a strong $RT_h$ to load sensitivity. This is due in part to the bottleneck capacity of the subsystems supporting a function possibly being large relative to the current load, or the function may have sufficiently high priority on the bottleneck resource as to not be sensitive to the current level of congestion, or the function's bottleneck resource is dynamically allocated. For such cases, the $RT_h$ vs. load curves may be flat or decreasing.

From the transaction type invocation data records, the slope s of an ordinary linear least squares (straight line fitting) regression is calculated. The slope s is observed whether it is negative. For a given transaction type, the data pairs ($count_h$, $RT_h$) are acquired and regression coefficients are derived. $\bar{x}$ is the average over all the pairs of the $count_h$ observations. $\bar{y}$ is the average of the $RT_h$ observations. The centered counts variables $x_h$ are calculated $x_h = (count_h - \bar{x})$ and the centered average response time variables $y_h$ are calculated $y_h = (RT_h - \bar{y})$. Mathematically, the slope s is $$s = \frac{\sum x_h y_h}{\sum (x_h)^2} \quad (1)$$

(step 317).

If the slope s is negative, then no further analysis is performed (steps 319, 321). The expectation is that $RT_h$ is increasing with respect to increasing load. Transaction types showing a negative slope s are examined for bad invocation data records (step 323).

Embodiments make use of queuing theory and model the $RT_h$ of a specific function for a given load x as the sum of the sojourn time in each of the service nodes required to process the function with special attention given to a bottleneck service node. A Response Time Model RTM(x) may be used to determine transaction type load at which expected response times cross predefined delay objectives. The resulting RTM(x) model is a variant of the standard processor sharing model and has the form $$RTM(x) = z_0(x) + \frac{z'_1}{1 - \rho_b(x) - z'_2 x} \quad (2)$$
$$\approx z_0 + \frac{z_1}{1 - z_2 x}$$

where $z_0(x)$ is the amount of time to traverse all non-bottleneck service nodes in a function's work flow, $z'_1$ is the unnormalized expected amount of time to traverse the bottleneck node under no or very low transaction load, $z_1$ is the normalized expected amount of time to traverse the bottleneck node under no transaction load, $z'_2$ is the unnormalized average amount of time used per transaction of the bottleneck node and $z_2$ is the normalized average amount of time of the bottleneck node (direct and indirect) per transaction. The $z_0(x)$ sojourn time is taken to be a constant $z_0$ since as the load approaches the bottleneck's limiting rate, the non-bottleneck service nodes contribute significantly less to the $RT_h$ relative to the bottleneck contribution. $\rho_b(X)$ is the additional utilization on the bottleneck node due to other functions' load. This utilization is rewritten to reduce it into a background constant plus a part that varies in conjunction with the transaction's load $$\rho_b(x) \approx \rho_{b0} + \delta x \quad (3)$$

where $\rho_{b0}$ is the utilization of the bottleneck node that is independent of the transaction's load and $\delta x$ is the utilization that is dependent on the transaction's load x. Substituting, RTM(x) (2) may be rewritten in a simpler form $$RTM(x) = z_0(x) + \frac{z'_1}{1 - \rho_b(x) - z'_2 x} \quad (4)$$
$$= z_0 + \frac{z'_1}{1 - \rho_{b0} - \delta x - z'_2 x}$$
$$= z_0 + \frac{z'_1}{1 - \rho_{b0} - (\delta + z'_2)x}$$
$$= z_0 + \frac{z'_1}{1 - \rho_{b0} - (\delta + z'_2)x} \left( \frac{\frac{1}{1 - \rho_{b0}}}{\frac{1}{1 - \rho_{b0}}} \right)$$

$$= z_0 + \frac{z_1}{1 - z_2 x}.$$

By using the observations on the pairs of carried load counts $count_h$ and associated $RT_h$ $(count_h, RT_h)$, the z parameters $z_0$, $z_1$ and $z_2$ may be estimated. One method to estimate the $z_0$, $z_1$ and $z_2$ parameters is to let the estimates be the constrained values of z that minimize the sum of $$(\log(RT_h) - \log(RTM(count_h|z)))^2 \quad (5)$$

subject to the constraints $z_0 \geq 0$, $z_1$ and $z_2 > 0$. The $z_0$, $z_1$ and $z_2$ parameters are found by using the standard conjugate-gradient method. Other methods for estimating the $z_0$, $z_1$ and $z_2$ parameters are possible (steps 325, 327).

$$\frac{1}{z_2}$$

is the estimated maximum function load or throughput for the transaction type that the complex system can handle. Functions with large $z_0 + z_1$ are functions that are the major contributors to the sojourn times of business requests when multiple functions must be called on sequentially to complete the request. $z_0 + z_1$ is the best expected response time that may be achieved.

For transactions using a complex system, there may not be explicit $RT_h$ requirements for each of the different transactions. Moreover, in some cases the requirements may be set poorly. For these cases, the general capacity rule is to avoid the "knee" of the response curve. Such requirements are useful but only if the definition of what is the knee is clear. In general, the response curve knee is a vague concept. However, Kleinrock's knees definitions are used for the response curve knees to set capacity limits.

Figure 4:
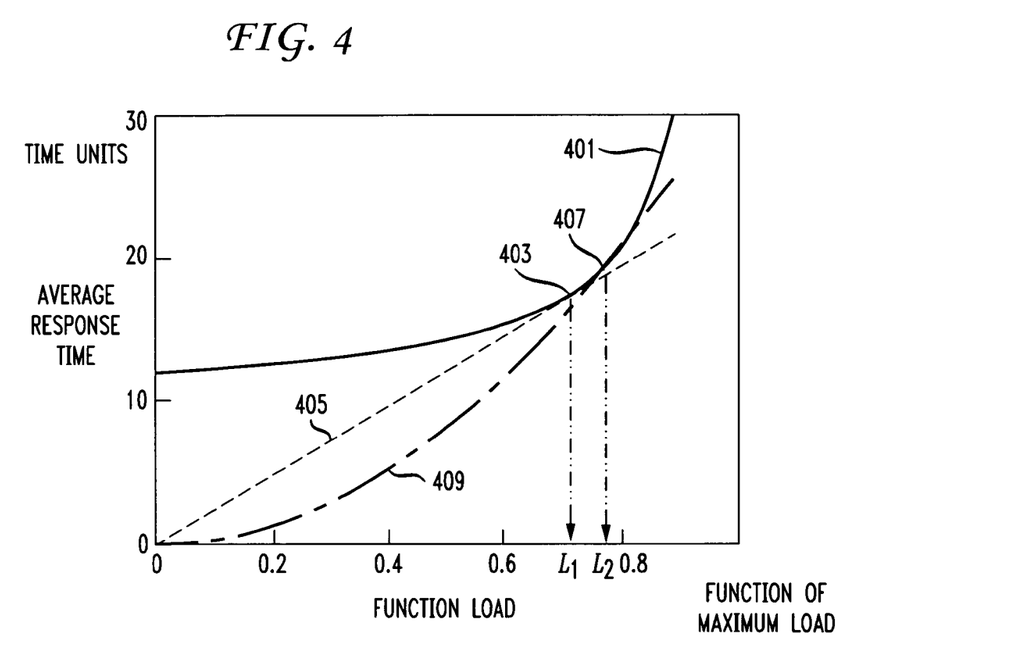
FIG. 4 is an exemplary plot of transaction type average response time vs. function load, with linear and quadratic limits that identify response time curve knees.

FIG. 4 shows an RTM curve (solid line) 401, a capacity warning value or linear limit $L_1$ is the x coordinate of the point 403 that is the tangent intersection of the line going through the origin (dotted line) 405 with the RTM curve 401. A capacity limit value or quadratic limit $L_2$ is the x coordinate of the point 407 that is the tangent intersection of a quadratic curve going through the origin (broken line) 409 with the RTM curve 401. These are Kleinrock's knees.

The capacity warning value $L_1$ is the first warning of load increasing to a point where the performance of the complex system may start to degrade based on the knees analysis. When $z_0$ is not zero, the capacity warning value $L_1$ is $$L_1 = \frac{z_0 + z_1 - (z_0 z_1 + z_1^2)^{\frac{1}{2}}}{z_0 z_2}. \quad (6)$$

When $z_0$ is equal to zero, the capacity warning value $L_1$ is $$L_1 = \frac{1}{2z_2}. \quad (7)$$

The capacity limit value or quadratic limit value $L_2$ is the safe operating point based on the knees analysis. When $z_0$ is not zero, the capacity limit value $L_2$ is $$L_2 = \frac{4z_0 + 3z_1 - (8z_0 z_1 + 9z_1^2)^{\frac{1}{2}}}{4z_0 z_2}. \quad (8)$$

When $z_0$ is equal to zero, the capacity limit value $L_2$ is $$L_2 = \frac{2}{3z_2} \quad (9)$$

(step 329).

When there are stated performance requirements, the associated capacity limit is calculated (steps 331, 333).

Results are displayed and an analysis of the time trends suggest, if current trends continue, when the various capacity limits will be reached (step 335). Displays may include a plot of the data $(count_h, RT_h)$.

Figure 5:
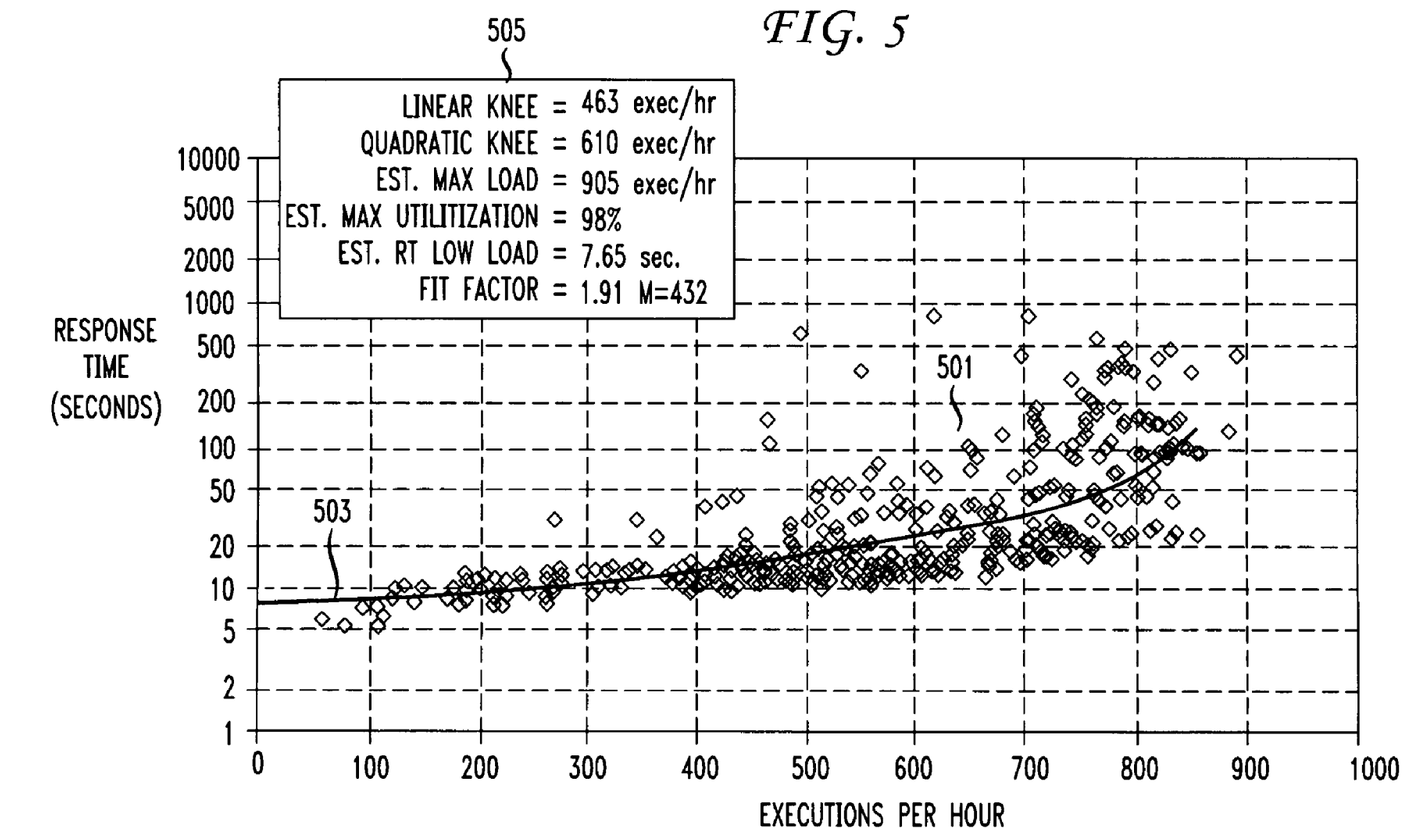
FIG. 5 is an exemplary plot of average response time vs. counts showing a response time model curve overlay and a table of results.

FIG. 5 shows a plot of $RT_h$ vs. $count_h$ 501 with an overlay of the resulting model curve 503 and a summary table of results 505. The table 505 shows the capacity limit value (linear knee) $L_1$, the capacity warning value (quadratic knee) $L_2$, the estimated maximum load $$\frac{1}{z_2}$$

for this transaction type, the current estimated maximum utilization in percent, the estimated $RT_h$ at low load, a model fit factor indicating how well the model and data agree and the number of data points M used in the analysis.

Figure 6:
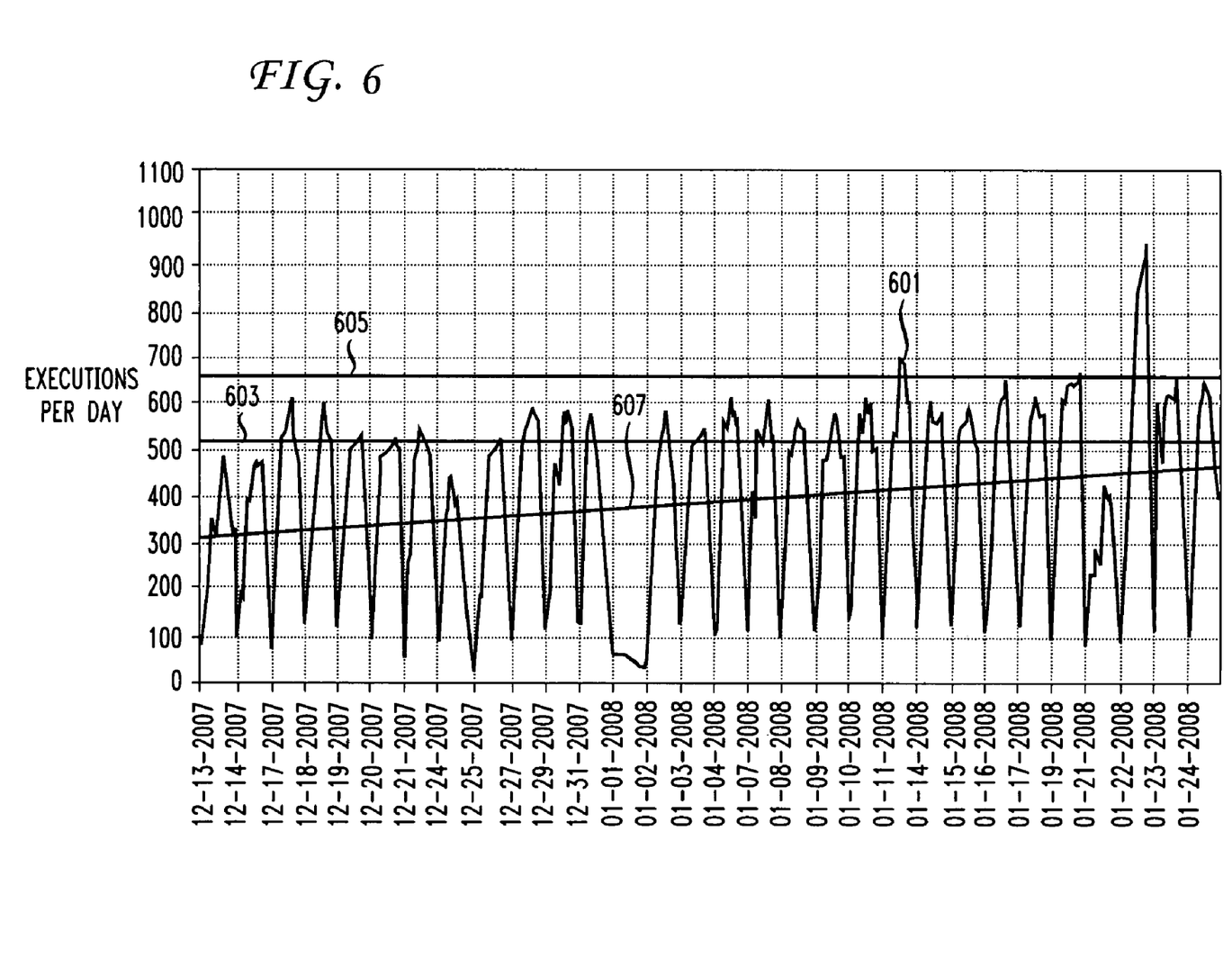
FIG. 6 is an exemplary plot of counts vs. time (date) showing a performance projection to predict when the counts will cross a capacity warning value $L_1$ and a capacity limit value $L_2$.

A time series plot may also be displayed. FIG. 6 shows $count_h$ data vs. time (date) 601 with lines at a capacity limit value (linear knee) $L_1$ 603 and at a capacity warning value (quadratic knee) $L_2$ 605. A linear growth performance projection 607 is fit and used to predict when the counts data is expected to cross the capacity limit value $L_1$ 603 and the capacity warning value $L_2$ 605.

For the different transaction types, given the analysis and the projected time until capacity exhaust $L_2$, it may be necessary to increase capacity or shift load prior to the capacity limit date and continue to track the load growth and response times for possible changes to the capacity limit date. An analysis may be performed after a new release of major subsystems to understand what the field capacity is and if the complex system can support the projected load increases until the next planned capacity increase. If not, systems engineers work to close the gap between demand and system capacity.

Knowing the capacity limits and the time series analyses for different transaction types allows operations to focus on transactions that are in overload or that are approaching overload. Rather than examining all subsystems in a complex system, embodiments indicate which transaction types are of concern which in turn identifies one or more subsystems.

One or more embodiments of the present invention have been described. Nevertheless, it will be understood that various modifications may be made without departing from the spirit and scope of the invention. Accordingly, other embodiments are within the scope of the following claims.

What is claimed is:

1. A method for determining capacity in complex systems by setting capacity values for service transaction types that assist in identifying performance bottlenecks comprising:
   listing the service transaction types;
   identifying Workflow Manager (WFM) data where invocation data records for each of the service transaction types are located;

retrieving the WFM data;
parsing the WFM data to acquire the invocation data records for each of the service transaction types;
for a given transaction type;
  determining average response time $RT_h$ aggregation levels and volume counts $count_h$, wherein the volume counts $count_h$ is the traffic load and is a count of successful transactions within a predetermined measurement interval h and the average response time $RT_h$ is calculated for successful transactions within the predetermined measurement interval h;
  performing a linear regression of data pairs ($count_h$, $RT_h$);
  determining a Response Time Model RTM (x) to be $$z_0 + \frac{z_1}{1 - z_2 x},$$

wherein the RTM (x) models the average response time $RT_h$ of a specific function for a given load (x) as the sum of the sojourn time in each service node required to process the function, wherein $z_0$ is the expected amount of time to traverse non-bottlenecked nodes, $z_1$ is the expected amount of time to traverse a bottleneck node under no transaction load and $z_2$ is the average amount of time of a bottleneck node per transaction type;
  estimating the response time model z parameters $z_0$, $z_1$ and $z_2$ from the data pairs ($count_h$, $RT_h$)
  calculating a maximum throughput $$\frac{1}{z_2}$$

that the complex system can handle;
  calculating a capacity warning value (linear knee) $L_1$;
  calculating a capacity limit value (quadratic knee) $L_2$; and
  analyzing a time trend of the volume counts $count_h$ to determine when the capacity warning value $L_1$ and the capacity limit value $L_2$ will be reached if the current volume counts $count_h$ trends continue.

2. The method according to claim 1 wherein the service transaction types comprise "get home address", "get billing address" and "get billing information".

3. The method according to claim 1 wherein retrieving WFM data further comprises using agents, bots, spiders and other network mechanisms.

4. The method according to claim 1 wherein parsing the WFM data further comprises obtaining invocation data records "start time", "end time", "success" and "fail".

5. The method according to claim 4 wherein if the parsed WFM data does not include the invocation data record for "duration", calculating a difference between "start time" and "end time" as the "duration", wherein "duration" is the service transaction type invocation response time.

6. The method according to claim 5 further comprising filtering the invocation data records from the parsed WFM data.

7. The method according to claim 1 wherein determining the average response time $RT_h$ aggregation levels and the volume counts $count_h$ further comprises for the predetermined measurement intervals which have less than a predefined number of successful transactions, excluding those records from consideration.

8. The method according to claim 7 wherein the predefined number of successful transactions is at least 30.

9. The method according to claim 1 further comprising identifying abnormal complex system behavior.

10. The method according to claim 9 wherein identifying abnormal complex system behavior comprises:

summing all "success" and "failed" invocation data records within the predetermined measurement interval;
summing all of the "failed" invocation data records within the predetermined measurement interval; and
if the sum of the "failed" invocation data records is greater than a predefined percentage of the sum of the "success" and "failed" invocation data records, declaring an abnormal condition.

11. The method according to claim 1 wherein the linear regression further comprises:
calculating a slope s of a least squares regression; and
determining whether the slope s is negative.

12. The method according to claim 11 wherein calculating the slope s of the least squares regression further comprises:
for the data pairs ($count_h$, $RT_h$);
averaging all of the $count_h$ observations as $\bar{x}$;
averaging all of the $RT_h$ observations as $\bar{y}$;
calculating centered counts variables $x_h$ equal to $count_h - \bar{x}$;
calculating centered average response time variables $y_h$ equal to $RT_h - \bar{y}$; and
calculating the least squares regression slope s as $$\frac{\sum x_h y_h}{\sum (x_h)^2}.$$

13. The method according to claim 12 further comprising if the least squares regression slope s is negative, stopping further analysis.

14. The method according to claim 13 further comprising examining the invocation data records producing the negative slope s.

15. The method of claim 1 wherein estimating the response time model z parameters $z_0$, $z_1$ and $z_2$ further comprises:
estimating the $z_0$, $z_1$ and $z_2$ parameters as the constrained values of z that minimize the sum of $(\log(RT_h) - \log(RTM(count_h|z)))^2$ subject to the constraints $z_0 \geq 0$, $z_1$ and $z_2 > 0$ using a conjugate-gradient method.

16. The method according to claim 15 wherein when the z parameter $z_0$ is not equal to zero, the capacity warning value $L_1$ is $$\frac{z_0 + z_1 - (z_0 z_1 + z_1^2)^{\frac{1}{2}}}{z_0 z_2}$$

and when the z parameter $z_0$ is equal to zero, the capacity warning value $L_1$ is $$\frac{1}{2 z_2}.$$

17. The method according to claim 15 wherein when the z parameter $z_0$ is not equal to zero, the capacity limit value $L_2$ is $$\frac{4 z_0 + 3 z_1 - (8 z_0 z_1 + 9 z_1^2)^{\frac{1}{2}}}{4 z_0 z_2}$$

and when the z parameter $z_0$ is equal to zero, the capacity limit value $L_2$ is $$\frac{2}{3 z_2}.$$

18. The method according to claim 15 wherein $z_0 + z_1$ is the best expected response time that can be achieved.

* * * * *